Patented Feb. 12, 1924.

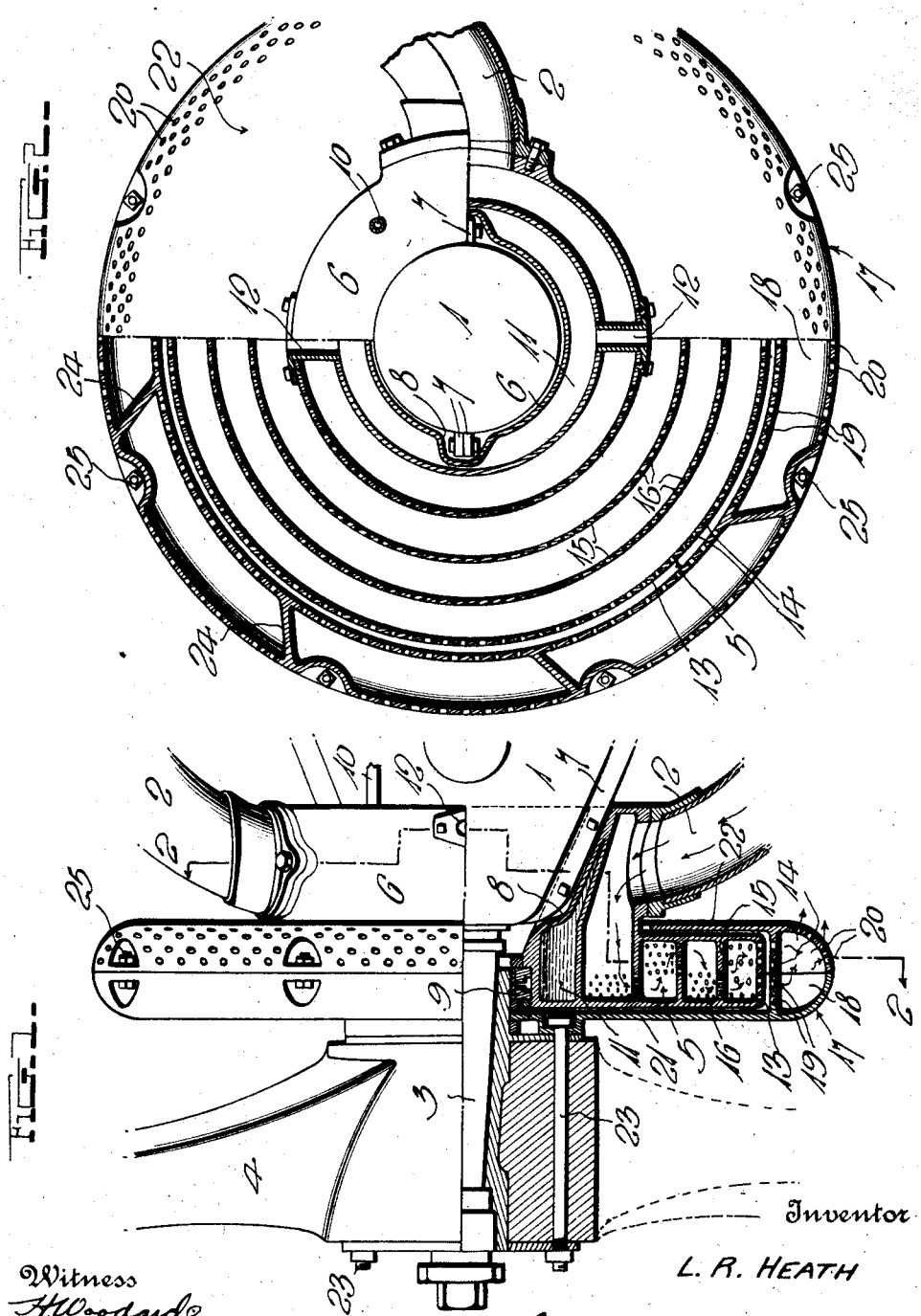

1,483,805

UNITED STATES PATENT OFFICE.

LAURENCE R. HEATH, OF QUANTICO, VIRGINIA, ASSIGNOR OF FORTY-NINE PER CENT TO JOSEPH LABBEE, JR., OF QUANTICO, VIRGINIA.

ENGINE MUFFLER.

Application filed April 17, 1922. Serial No. 553,775.

*To all whom it may concern:*

Be it known that I, LAURENCE R. HEATH, a citizen of the United States, residing at Quantico, in the county of Prince William and State of Virginia, have invented certain new and useful Improvements in Engine Mufflers; and I do declare the following to be a full, clear, and exact description of the invention, such as will enable others skilled in the art to which it appertains to make and use the same.

My invention relates to improvements in engine mufflers and more particularly to those of the type employing relatively rotatable sections for respectively receiving and discharging the exhaust gases.

The principal object of the invention is to provide a simple and efficient muffler which may be compactly located between an aircraft engine and a propeller mounted on the shaft of said engine, provision being preferably made whereby the exhaust receiving section of the muffler will surround the front end of the crank case, while the exhaust discharging section is adapted to rotate with the propeller.

A further object of the invention is to provide a muffler of the class set forth provided with perforations in one wall of the exhaust receiving casing and to provide the rotatable or exhaust delivery casing with a hollow rim perforated at both its inner and outer peripheries, the two casings being so related as to effectively silence the exhaust as the gases pass from the perforations of the fixed casing into the rotary casing and from the latter through its perforations.

A still further object is to provide the above mentioned hollow rim with a plurality of oblique partitions which assist materially in properly expelling the exhaust gases.

With the foregoing and minor objects in view, the invention resides in the novel subject matter hereinafter described and claimed, the description being supplemented by the accompanying drawings which illustrate my invention in connection with an aircraft engine, although it will be understood that its use is not restricted to this particular field.

Figure 1 of the drawings illustrates a plan view partly in horizontal section, showing the compact relation of my improved muffler with respect to an aircraft engine and a propeller on the shaft thereof.

Figure 2 is a rear elevation partly in section as indicated by the broken line 2—2 of Fig. 1.

In the drawings above briefly described, the numeral 1 designates the crank case of an aircraft engine which in the present instance is considered as being of the V-type, each bank of cylinders being provided with an exhaust pipe 2 in the usual manner. The shaft 3 of the engine extends forwardly from the crank case 1 and carries a propeller 4 in the well known manner. By the construction of my invention, it may be located between the crank case 1 and the propeller 4, thereby occupying a space which is usually idle, thereby contributing to the necessary compactness required on any airplane, seaplane, or other aircraft.

The numeral 5 designates a flat-sided exhaust-receiving casing of annular form to non-rotatably surround the front end of the crank case 1, said casing being by preference provided with a rearwardly extending hub portion 6 of hollow form, communicating with the interior of the casing. The exhaust pipes 2 are connected with the hub portion 6 in the present disclosure and said hub portion is internally shaped to rather snugly receive the front end of the crank case as shown clearly in the drawings. As the crank case is usually provided with outwardly extending flanges 7, the hub portion 6 is formed with internal grooves 8 to receive said flanges. It will be understood however that the formation of the casing 5 for adaptation to the crank case 1, may vary according to the shape and construction of the latter.

Between the casing 5 and the shaft 3, a suitable bearing 9 is preferably provided and lubricant may well be supplied to this bearing through a tube 10. To prevent the exhaust gases in the casing 5 from overheating the bearing 9, said casing is provided around the bearing with a water pocket 11 which preferably extends into the hub portion 6 as shown in Fig. 1 so that the connections 12 for circulating water through the pocket 11, may be located in the manner shown, being readily accessible for the attachment of water circulating pipes.

The outer peripheral wall 13 of the casing 5 is preferably formed with perforations 14 throughout its width and a plurality of concentric partitions 15 are provided in said casing, which are by preference perforated only throughout half of their widths, the perforations of adjacent partitions being so related that the exhaust gases must zig-zag as indicated by the arrows in Fig. 1, before escaping through the perforations 14. The staggered perforations of the partitions 15 are designated by the reference numeral 16 and the relation of the perforations of each partition to the next, is shown most clearly in Fig. 1.

The numeral 17 designates an outer or exhaust-discharging casing surrounding the casing 5 and adapted to rotate with the propeller 4. In the present showing, the casing 17 is provided with a hollow rim 18 whose inner wall is in extremely close proximity to the peripheral wall 13 of the casing 5 and is perforated throughout its width as indicated by the reference numeral 19. The outer peripheral wall of the rim 18 is preferably perforated only throughout about half of its width as indicated by the numeral 20, so that there is no chance of air currents entering the front portion of the rim and interfering with the proper exhaust of gases. From the rim 18, front and rear side walls 21 and 22 extend inwardly and receive therebetween the casing 5. The wall 21, as here shown, is secured by bolts 23 to the hub of the propeller 4, so that the entire casing 17 is rotated with said propeller. It will be understood however that this casing might be otherwise connected with the shaft 3 for rotation with the same.

To assist in properly discharging the exhaust gases through the muffler, the hollow rim 18 of the casing 17 is in most instances provided with a plurality of transverse partitions 24, each of which is oblique to a line radiating from the axis of the muffler (see Fig. 2).

When the construction herein shown is used, it is necessary to construct the casing 7 of two sections secured together as indicated at 25 in order that proper assembly can be made. It is to be understood however that my invention is not to be restricted to such details of construction as the manner of constructing the numerous parts to insure proper assembly.

From the foregoing, it will be seen that I have produced a comparatively simple muffler, yet one which will be highly efficient and in every way desirable. While the invention is intended principally for use upon the engines of numerous forms of aircraft, it may of course be used on other forms of motors and while I have described the several details of construction with considerable particularly, it is to be clear that within the scope of the invention as claimed, numerous changes may be made.

I claim:

1. The combination with an aircraft engine having a forwardly extending shaft and a propeller for the aircraft thereon; of a muffler about the shaft interposed between said engine and propeller and comprising a non-rotatable exhaust-receiving section and an exhaust-discharging section rotatable with the aircraft propeller.

2. The combination with an engine; of an annular exhaust-receiving casing surrounding one end of the crank case of said motor and held against rotation thereon, and an exhaust-discharging casing surrounding said exhaust-receiving casing and rotating when the engine shaft is rotating.

3. A muffler comprising an annular exhaust-receiving casing surrounding one end of an engine crank case and internally shaped to conform to the shape of the crank case whereby the crank case may hold the casing against rotation, and an exhaust-discharging casing surrounding said exhaust-receiving casing and adapted to rotate when the engine shaft is rotating.

4. A muffler comprising an annular exhaust-receiving casing having a hub portion extending from one side and internally shaped to non-rotatably surround one end of an engine crank case, and an exhaust-discharging casing surrounding said exhaust-receiving casing and adapted to rotate when the engine shaft is rotating.

5. A muffler comprising a flat-sided circular exhaust-receiving casing adapted to be fixedly mounted, said casing having a perforated peripheral wall for discharging the exhaust gases; and an exhaust-discharging casing comprising an annular hollow rim closely surrounding said perforated peripheral wall, and annular side walls extending inwardly from said rim and receiving said exhaust-receiving casing therebetween; said hollow rim being perforated at its inner and outer peripheries and being adapted to be connected with a rotary part.

6. The structure specified in claim 5; together with a plurality of partitions in said hollow rim, each oblique to a line radiating from the axis of the exhaust-discharging casing.

7. The structure as specified in claim 3; said exhaust-receiving casing having an internal bearing to receive the engine shaft, and a water pocket around said bearing to prevent the exhaust gases from overheating the same.

8. A structure as specified in claim 5: together with concentric perforated partitions in said exhaust-receiving casing.

9. A muffler comprising a flat-sided circular exhaust-receiving casing adapted to be fixedly mounted, said casing having a perforated peripheral wall for discharging exhaust gases, and an exhaust discharging casing rotatably fitting about said exhaust receiving casing and having side walls extending along the side walls of the exhaust receiving casing and a peripheral wall, arcuate in cross section, connecting said side walls and having its rear portion provided with perforations for permitting the discharge of exhaust gases through its rear portion.

10. A muffler comprising an exhaust-receiving casing adapted to be fixedly mounted and having its central portion provided with an inlet and having its peripheral portion provided with outlets, and an exhaust discharging casing rotatably fitting about said exhaust receiving casing for rotation about the same, said exhaust discharging casing having side walls extending upon opposite sides of the exhaust receiving casing and a peripheral wall connecting the side walls and provided with outlet perforations, one of said side walls having its central portion provided with openings whereby fastener bolts for the hub portion of a propeller may be passed through said openings to secure the exhaust discharging casing to a propeller.

In testimony whereof I have hereunto set my hand.

LAURENCE R. HEATH.